(12) United States Patent
Smith et al.

(10) Patent No.: US 8,434,154 B1
(45) Date of Patent: Apr. 30, 2013

(54) METHOD AND APPARATUS FOR DISTRIBUTING CONTENT ACROSS PLATFORMS IN A REGULATED MANNER

(75) Inventors: Kelly Smith, Hebron, KY (US); Michael Bigley, Goshen, OH (US); Christopher Hagan, Cincinnati, OH (US)

(73) Assignee: RGI, Inc., Cincinnati, OH (US)

( * ) Notice: Subject to any disclaimer, the term of this patent is extended or adjusted under 35 U.S.C. 154(b) by 37 days.

(21) Appl. No.: 13/443,924

(22) Filed: Apr. 11, 2012

(51) Int. Cl.
*H04L 29/06* (2006.01)

(52) U.S. Cl.
USPC .................................. 726/26; 726/27; 726/29

(58) Field of Classification Search ...................... 726/26
See application file for complete search history.

(56) References Cited

U.S. PATENT DOCUMENTS

| | | | |
|---|---|---|---|
| 5,727,156 A | 3/1998 | Herr-Hoyman et al. | |
| 6,360,254 B1 | 3/2002 | Linden et al. | |
| 7,206,941 B2 | 4/2007 | Raley et al. | |
| 7,487,360 B1 * | 2/2009 | Lennie et al. | 713/181 |
| 8,024,227 B2 | 9/2011 | Howard et al. | |
| 2007/0083756 A1 * | 4/2007 | Le Floch et al. | 713/167 |
| 2007/0242827 A1 | 10/2007 | Prafullchandra et al. | |
| 2008/0244740 A1 * | 10/2008 | Hicks et al. | 726/22 |
| 2009/0257591 A1 * | 10/2009 | Mithal et al. | 380/252 |

FOREIGN PATENT DOCUMENTS

WO    WO 98/25373    6/1998

\* cited by examiner

*Primary Examiner* — Jung Kim
*Assistant Examiner* — Ayoub Alata
(74) *Attorney, Agent, or Firm* — Frost Brown Todd LLC

(57) ABSTRACT

It is possible to control access to content by means such as a method which comprises steps including receiving, at a content management platform, a set of data from a content creator. The set of data could comprise content and one or more restrictions on accessing the content. A key could then be generated for that content, as could a record associating the content with the one or more restrictions. Data comprising that key could then be sent over a network, and a content access request message comprising the key could be received from a remotely located host platform. The content access request message could be compared with the one or more restrictions, and, based on that comparison, the content access request message could be responded to with a page providing the content or an error page.

12 Claims, 9 Drawing Sheets

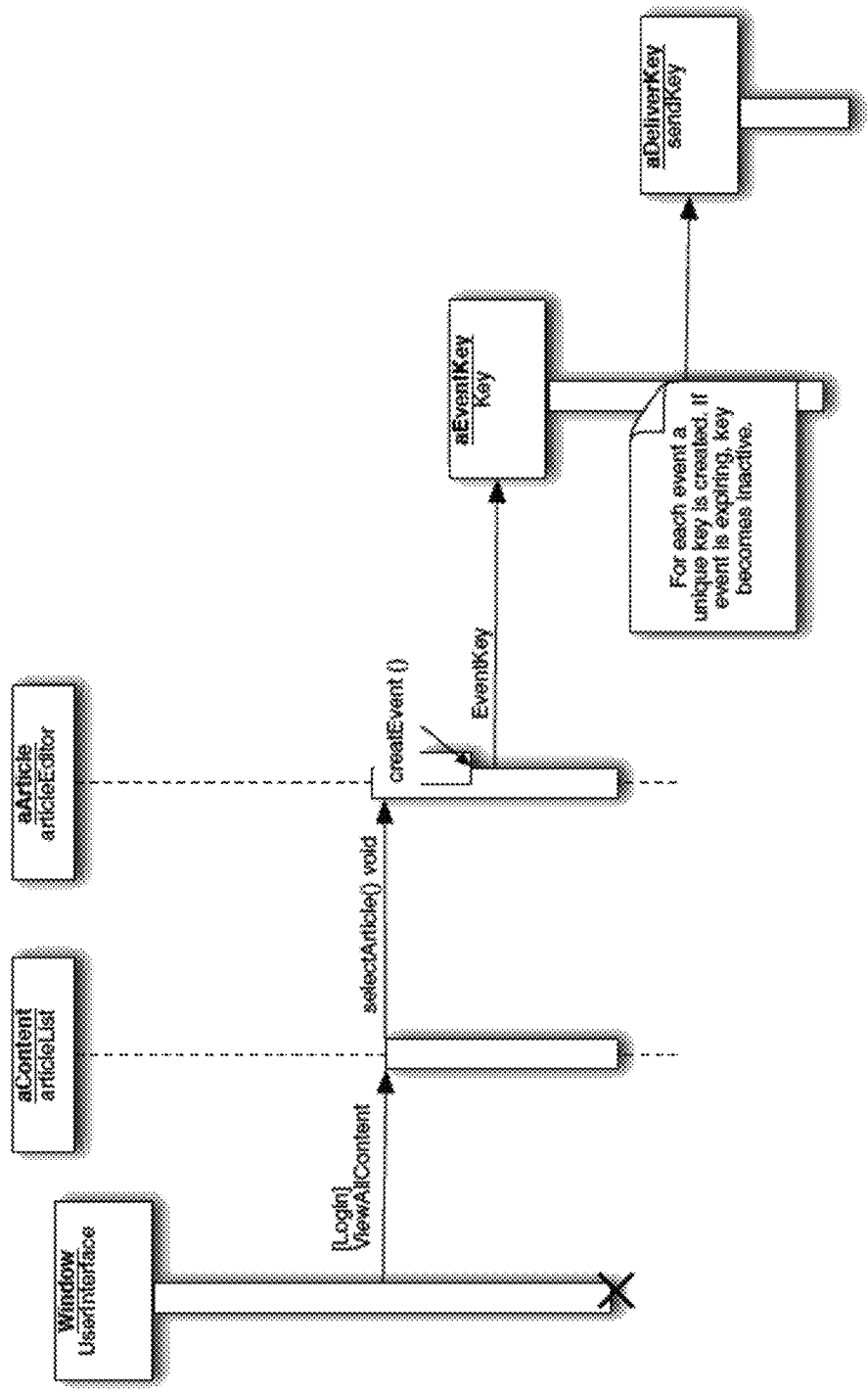
Figure 3.1

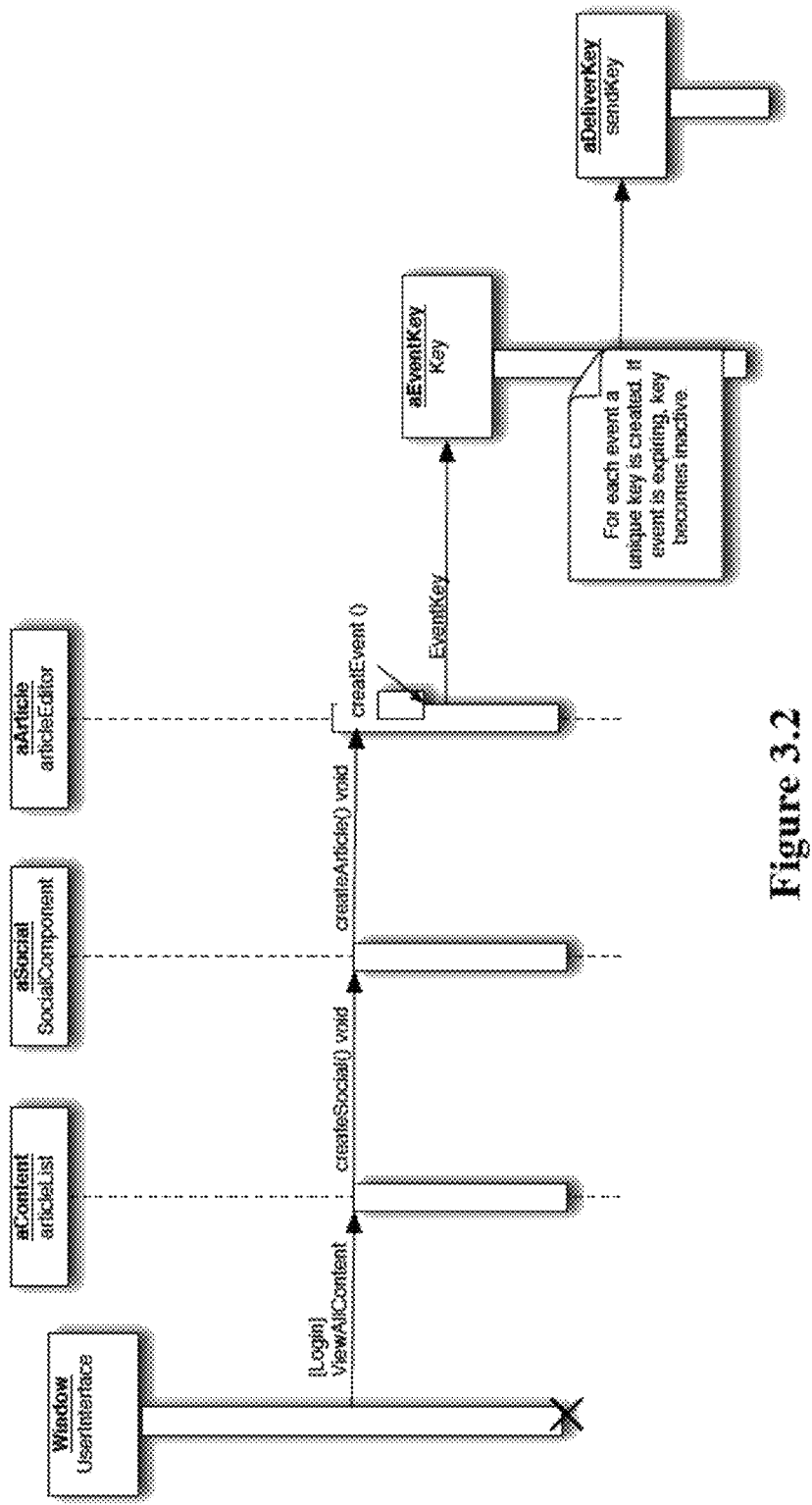
Figure 3.2

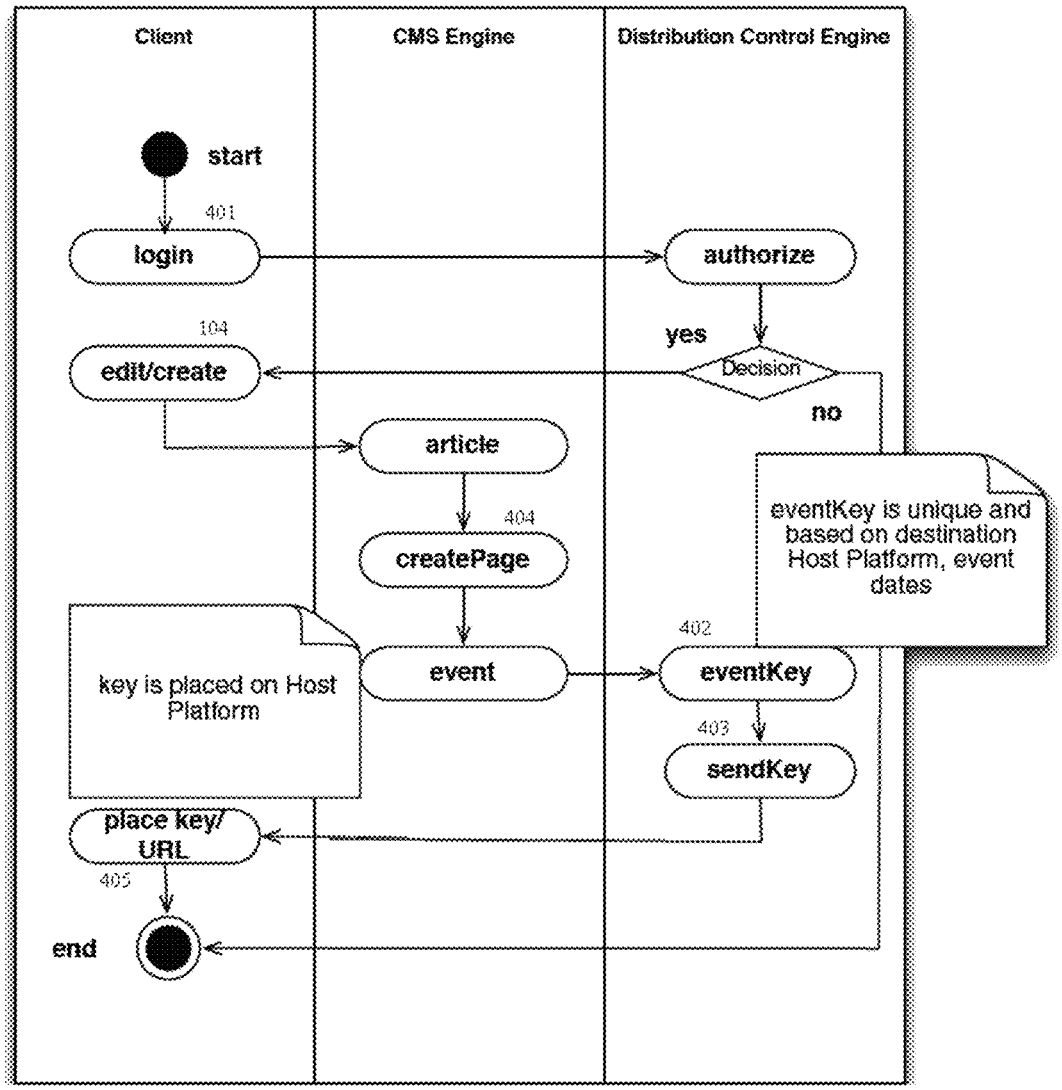
Figure 4.1

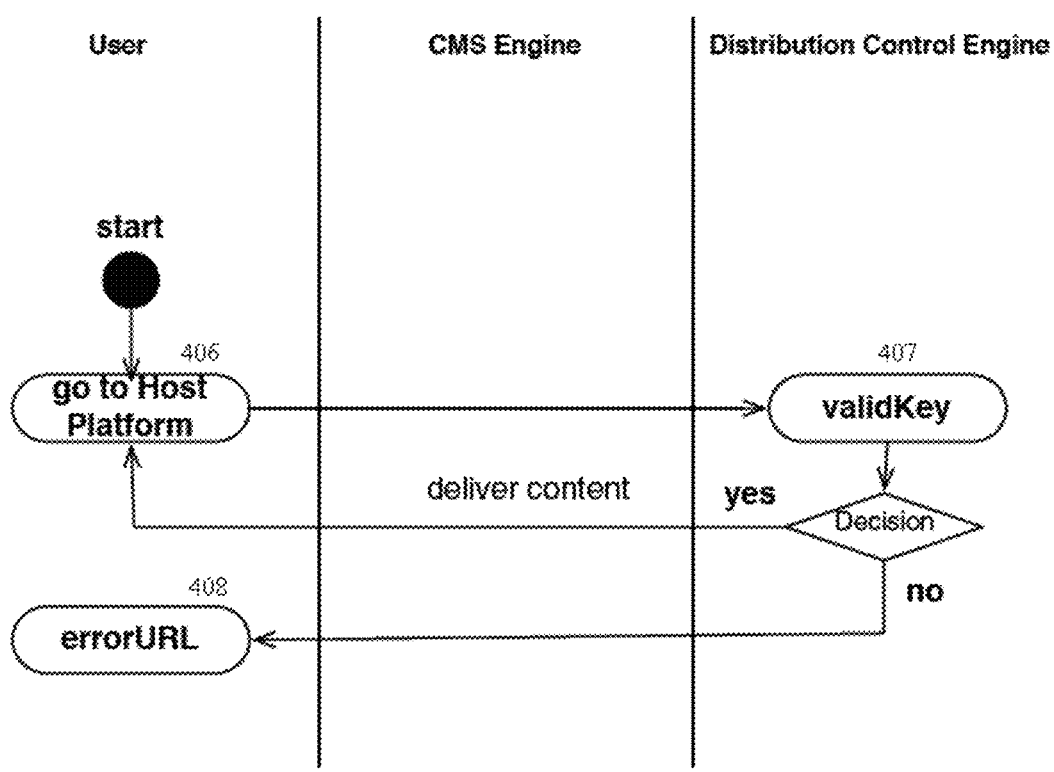
Figure 4.2

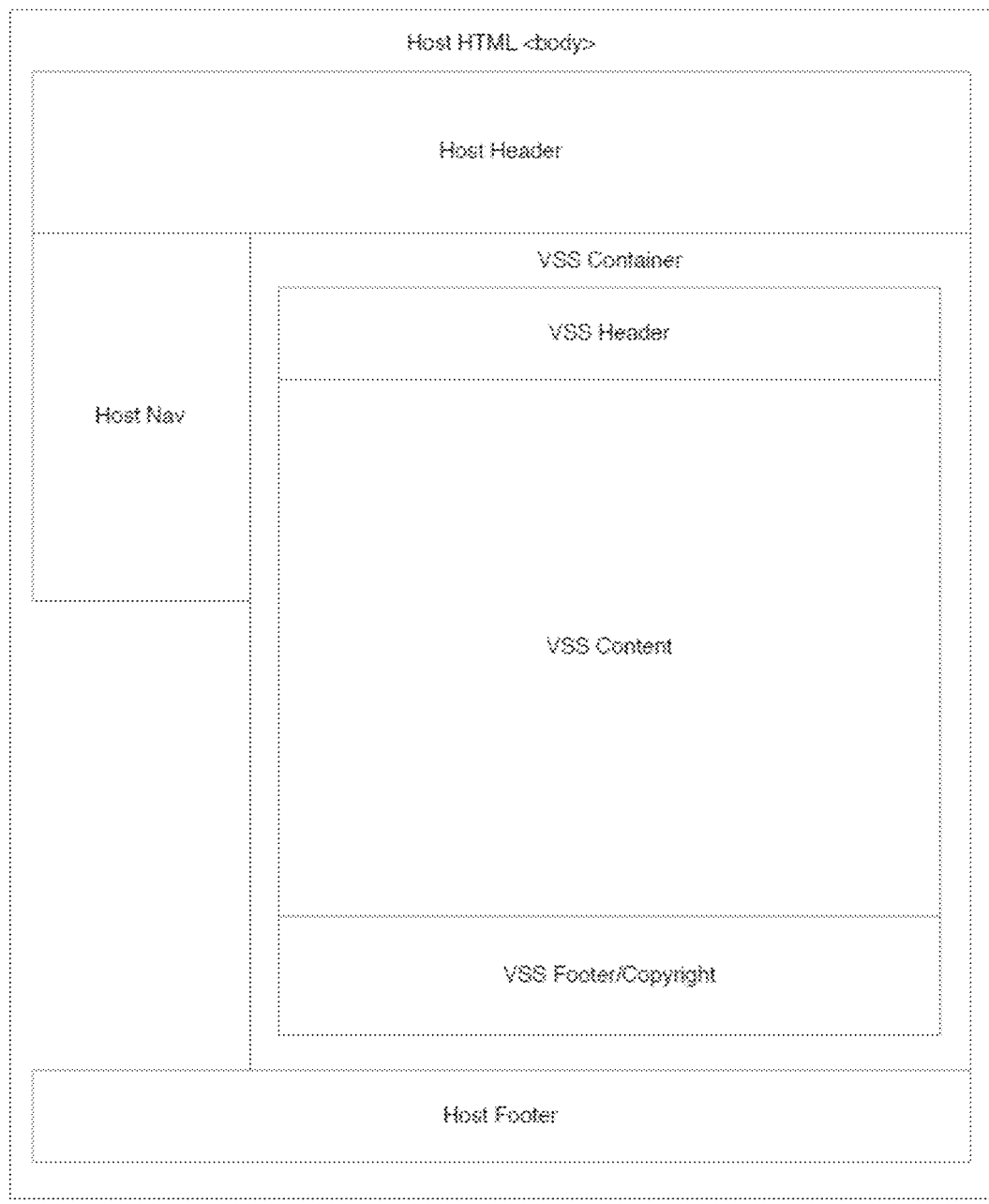
Figure 5.1

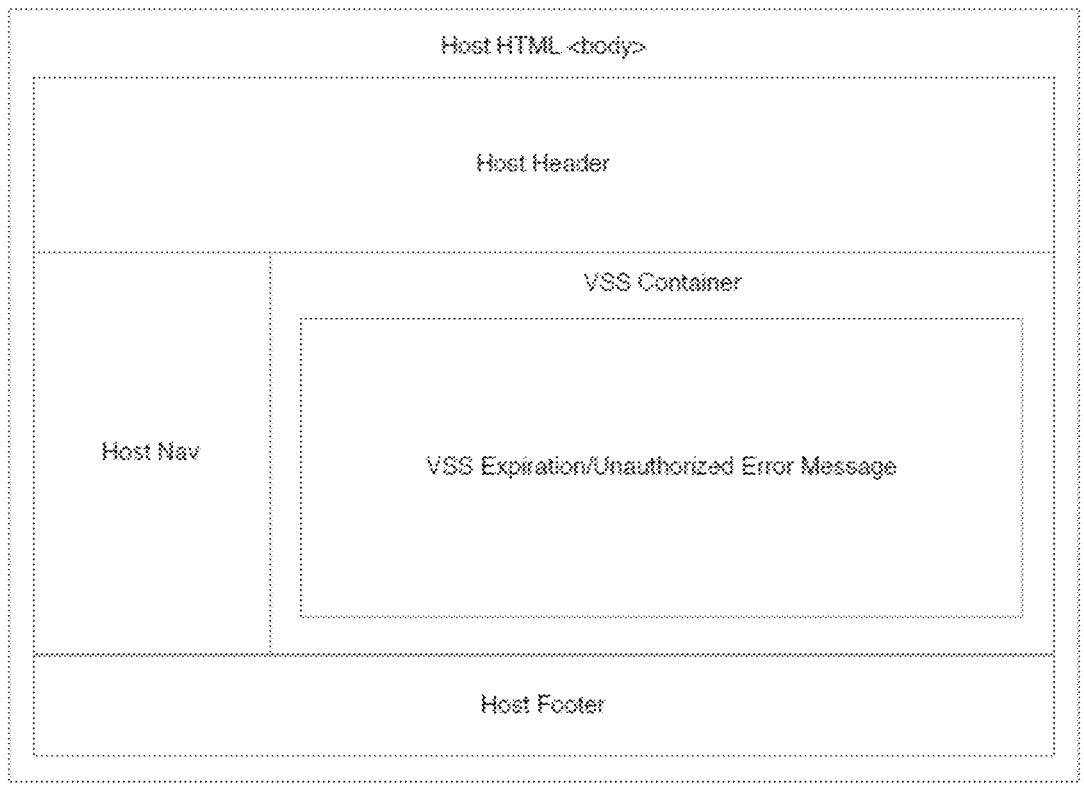
Figure 5.2

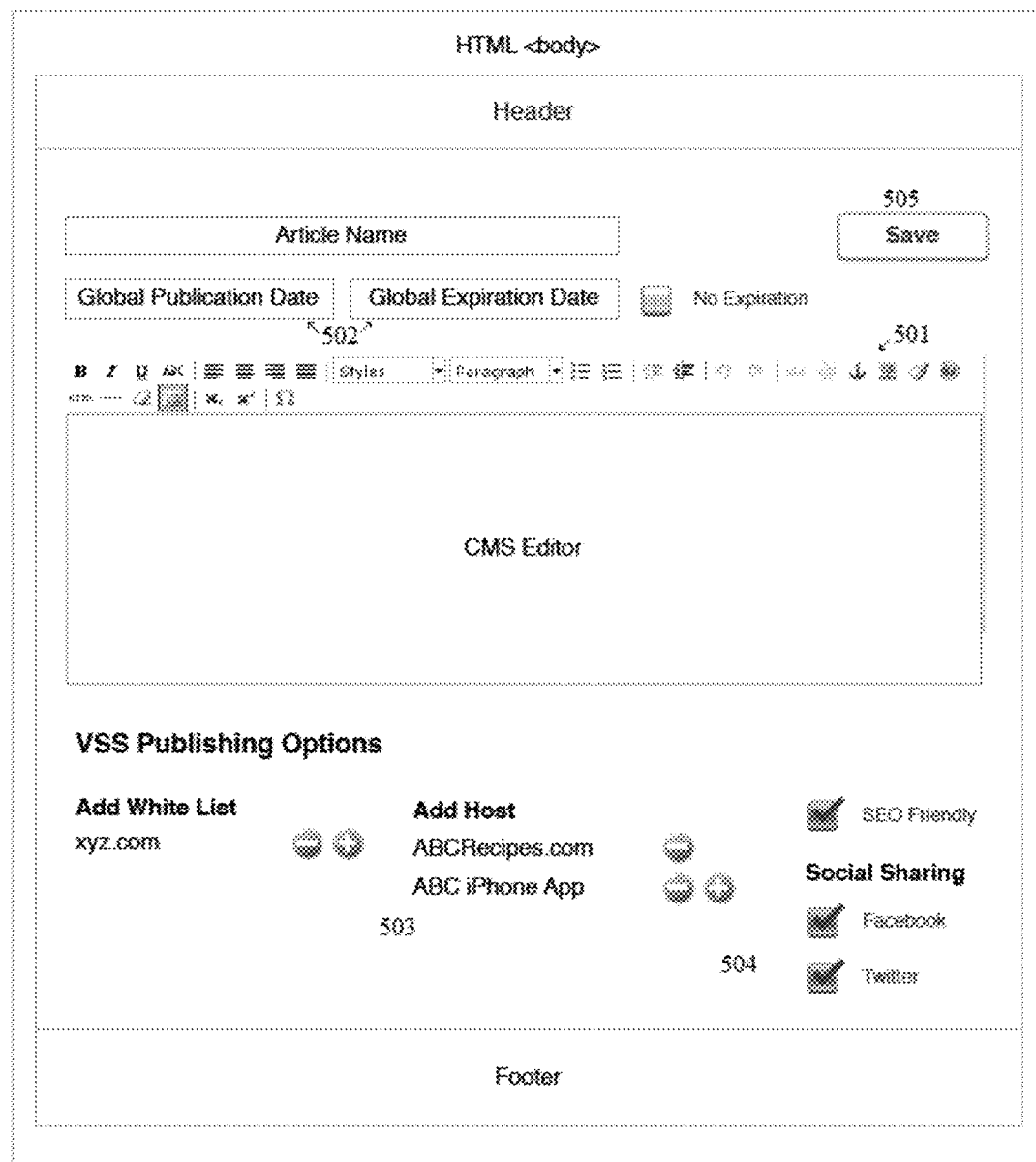
Figure 5.3

METHOD AND APPARATUS FOR DISTRIBUTING CONTENT ACROSS PLATFORMS IN A REGULATED MANNER

BACKGROUND

Currently content creators can spend significant time and money creating original content for digital publication, only to see content scrapers pull that content from the intended destination and republish on other sites, often referred to as content farms. Even worse, these content farms will often be promoted using search engine optimization tactics which result in the content farms having higher search rankings than the location where the content creator intended to publish the content. Accordingly, there is a need in the art for technology which can allow content creators to control aspects of how their content will be viewed, such as locations from which it can be accessed and/or time periods when their content can be accessed.

BRIEF DESCRIPTION OF THE DRAWINGS

The drawings and detailed description which follow are intended to be merely illustrative and are not intended to limit the scope of the invention as contemplated by the inventors.

FIGS. 3.1 and 3.2 illustrate sequences for creating or editing content in a system implemented using aspects of the disclosed technology.

FIG. 4 illustrates some sample activities for interacting with content managed using aspects of the technology described herein.

FIGS. 5.1-5.3 illustrate wireframes and mockups of information that could be presented to an end user and a dashboard for client content management.

SUMMARY

Figure 1:
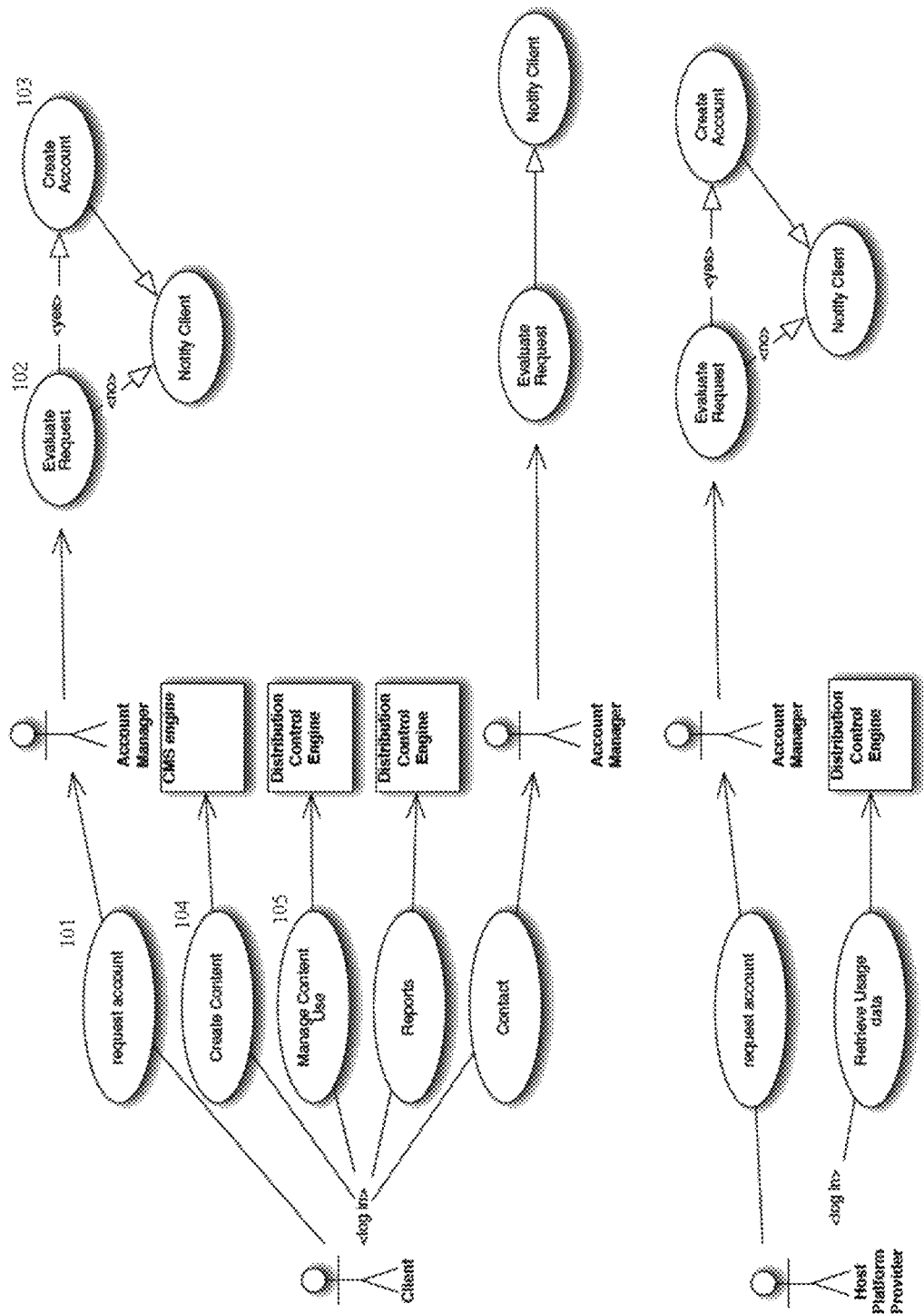
FIG. 1 illustrates how technology such as disclosed herein could be used, including how a content creator could get their content into a system implemented using aspects of the disclosed technology.

The inventors' technology can be implemented in a variety of manners, including in a method comprising steps such as receiving, at a content management platform, a set of data from a content creator. The set of data could comprise content and one or more restrictions on accessing the content. A key could then be generated for that content, as could a record associating the content with the one or more restrictions. Data comprising that key could then be sent over a network, and a content access request message comprising the key could be received from a remotely located host platform. The content access request message could be compared with the one or more restrictions, and, based on that comparison, the content access request message could be responded to with a page providing the content or an error page.

Other implementation of the inventors' technology, such as machines, articles of manufacture and additional methods are also possible, and will be immediately apparent to one of ordinary skill in light of this disclosure. Accordingly, the discussion set forth in this summary should be understood as being illustrative only, and not limiting.

DETAILED DESCRIPTION

For the purpose of understanding the inventors' technology, certain terms and phrases used in this disclosure should be understood as having certain meanings when used herein. First, the phrase "Very Secure Syndication" (abbreviated VSS) should be understood as an adjective phrase which indicates that the thing modified by the phrase is implemented with, or protected using, technology such as disclosed herein. For example, VSS content should be understood to refer to content which is protected using the inventors' technology. Additionally, the term "Client" should be understood as referring to a content creator who will use VSS technology to protect their content. Similarly, the phrase "Host Platform" should be understood to refer to the location of the server or servers hosting the content destination. This includes, but is not limited to, a URL (Universal Resource Locator) for a web site or mobile web site; an API key to an application, and an XML file. Finally, the term "User" should be understood to refer to those people who will use the Host Platform to access content that may include a combination of VSS and non-VSS content/data.

The inventors have conceived of novel technology which, for the purpose of illustration, is disclosed herein as applied to the context of protecting copyright and limiting/managing digital distribution of content. While the application of the inventors' technology in this context satisfies a long-felt but unmet need in the field, it should be understood that this disclosure should not be treated as implying limitations on potential fields where aspects of the inventors' technology can be beneficially applied. Accordingly, the disclosure set forth herein should be understood as being illustrative only, and not limiting.

To illustrate how aspects of the technology disclosed herein could be implemented, consider the following situation. A company produces food products. The company goes to great expense to create and test proprietary recipes that will enhance its products. The company does not want other sites to claim these recipes as their own or use them without permission. Nor does the company want its brand to be diluted by having one of its recipes appearing on ad-filled pages, perhaps even pages promoting a competitive brand. However, if a well known food website asks permission to use the company's recipe, the company would like to be able to grant limited use for that site.

To achieve this, as shown in FIGS. 1 and 4.1, the company, acting as a Client, could request an account [101] from a vendor who provides services using technology such as disclosed herein (VSS Services). After the request has been evaluated [102] and an account for the company has been created [103], the company can login [401] to its account and create or import the recipe [104]. An exemplary interface which can be used to create or import the recipe is shown in FIG. 5.3, in which the recipe could be added in a content management system (CMS) editor tool [501]. Once the recipe has been entered, it can be saved (e.g., using a save button [505] as shown in the interface of FIG. 5.3), which will cause a CMS engine on a VSS server, which could be implemented as an Apache web server, or other type of server currently existing or hereafter developed, to create a page which includes the recipe [404]. This page creation [404] could be performed in a variety of manners. For example, in some cases, it could take place by automatically generating HTML code which would cause a web browser to present the recipe to a user when accessing the Host Platform. This code could include any necessary formatting data (e.g., margins, fonts, indentations, etc) to accurately reflect the information to be displayed. Additionally, in some implementations, the code generated during page creation might include additional data to prevent site scrapers or other unauthorized entities from making use of the content creator's content, such as Javascript which could add transparent images over text to prevent copying, or CSS which could add garbled text that would be invisible to authorized users, but which would thwart scrapers or other entities which sought to copy the content. Other content (e.g., links to hit counters) could also be included in the output of the page creation step [404].

Figure 2:
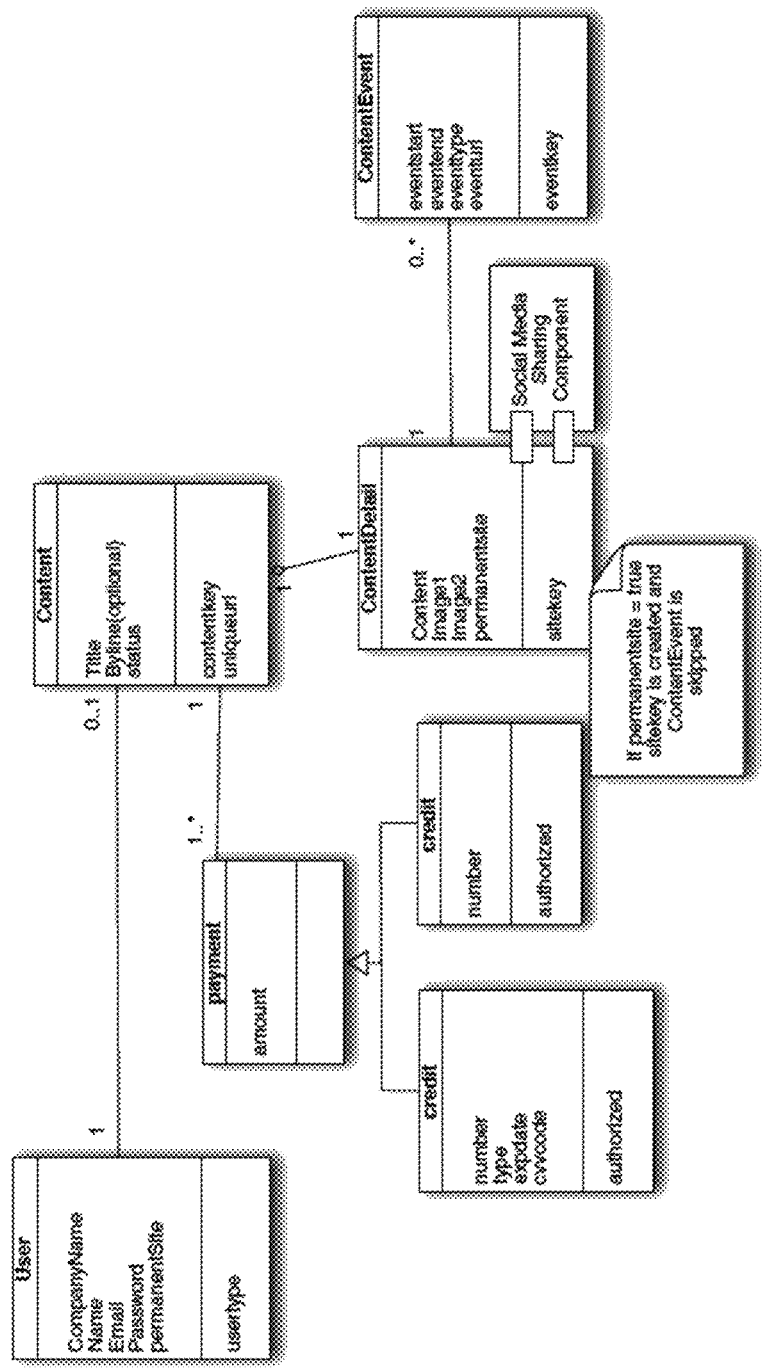
FIG. 2 illustrates classes which could be used by a content management server to implement aspects of the disclosed technology.

Once the page had been created [404], the CMS engine on the VSS server would create an event [405] which would trigger a distribution engine on the VSS server to generate [402] a key for the recipe—i.e., the contentKey (also referred to as an EventKey in the class diagram of FIG. 2, and the sequence diagrams of FIGS. 3.1 and 3.2). The distribution control engine could also create a record in a database (e.g., a MySQL database) on the VSS server indicating how the contentKey could be used to access the recipe (e.g., what Host Platforms the contentKey could validly be used on, time periods during which the content key is valid, times of day in which the contentKey is valid, and/or other criteria as specified by the company). At the same time, the contentKey, along with a unique embed code would then be sent [403] back to the company. The embed code would contain the contentKey and any special code that the host platform would require to execute the VSS properly. An example of this type of embed code is set forth below in table 1.

TABLE 1

Exemplary embed code.

```
<!-- Embed Code -->
<script
href="http://vss.rgidigital.com/en_US/core.js&appKey=111111111111&vssId=111111"></script>
<div id="vssContent" data-width="450"></div>
<!-- End Embed Code -->
```

It should be noted that the embed code set forth in table 1 is intended to be exemplary only, and that embed code which could be provided to a content creator would vary from platform to platform. For example, the values of appKey and vssID (set to 111111111111 and 111111 in table 1) would be unique to the content being shared and the particular Host Platform in question. Similarly, while the embed code provided in table 1 is JavaScript code, the embed code is not required to be JavaScript code. Instead, the specific format and parameters for the embed code will vary depending on the technology used in a Host Platform (e.g., ASP, PHP, etc.).

Preferably, the specific format, parameters and other information for the Host Platform will have been provided in advance by the Host Platform to the organization that operates the VSS server so that that organization can configure the VSS server to generate the appropriate embed code for the particular Host Platform. However, variations are also possible. For example, in some implementations, the company providing the content to be distributed might also provide the information for the Host Platform (e.g., through the interface of the CMS editor tool, or through a separate Host Platform configuration interface).

In addition to the embed code described above, the company could also be provided with a small script which could initiate a callback to the VSS server to enable the company's recipe to be displayed at the well known food website (which, in this example, would act as the Host Platform). While the operation and activation of this script could vary between implementations, it is preferred that this script be placed in the header of the page where the content creator's content would appear, as this would cause it to be activated at the beginning of a page load operation, thereby saving time for the User.

Finally, so that the recipe could be accessed through the well known food website, the company would place [405] (or have someone else place) the contentKey provided by the distribution control engine, potentially in combination with the callback script and embed code, on the Host Platform (i.e., in this example, the well known food website). Later, as shown in FIG. 4.2, when a User accesses the Host Platform [406] a callback would be made to the distribution control engine on the VSS server, providing the distribution control engine a copy of the contentKey provided by the company for the well known food website, as well as any other information which might be indicated in the callback script. Included in the information provided to the distribution control engine there will preferably be information (e.g., included in automatically generated packet headers sent with the callback message) indicating the Host Platform through which the User is seeking to view the recipe. The distribution control engine will then check [407] to see if the contentKey is a valid key for allowing the User to view the recipe, by checking to see if the information associated with the callback (e.g., time and date the callback was made, Host Platform being accessed by the User, etc) matched the information in the database associated with the contentKey. If the check indicated that the contentKey was a valid key for allowing the User to view the recipe, then the page which had previously been generated by the CMS engine would be returned and embedded in the page presented to the User as shown in FIG. 5.1. Alternatively, if the distribution control engine determined that the contentKey could not be validly used to view the recipe, then an error page would be returned [408] and incorporated into the page presented to the User as shown in FIG. 5.2.

Using techniques such as described above, a content creator (such as the company in the previous example) can maintain control over his or her content, even when it is distributed by third party sites, by providing the third party sites with information related to the content (e.g., the callback script and content key), rather than providing the third party sites with the content itself. This information could then be validated by distribution control software using parameters provided by the content creator before any user is allowed to access the content through the third party site. This results in an experience which is identical for all users except that, in the case of a user attempting to access content in an unauthorized manner, the user could be presented with a custom error page rather than the content creator's content.

Of course, it should be understood that the interfaces, methods and devices described above are capable of uses beyond those explicitly laid out. For example, while the interface of FIG. 5.3 was described in the context of creating content, it is possible that such an interface could also be used for other acts, such as managing [105] the user of a content provider's content. This could be done, for example, by setting dates when the recipe might be available, either globally with a global date range toll [502] or using date range tools that allow individual ranges to be set for individual Host Platforms. Other content management tasks could also be performed, such as identifying specific Host Platforms where the recipe could be viewed using a platform management tool [503], identifying sharing social network platforms where the recipe could be viewed using a social network tool [504], and identifying platforms on which the recipe can be delivered (e.g., via web, mobile app, desktop app, or RSS reader).

Further variations are also possible. For example, while the above description focuses on how the inventors' technology could be used to allow controlled access to content through a standard web browser, the inventors' technology is not limited to that type of situation. To illustrate, consider the fact that certain software has been developed which aggregates web content (e.g., RSS feeds) for easy user access. If a content creator, such as a blogger, is using technology such as disclosed herein to protect his or her content, it would be undesirable if the use of the disclosed technology prevented the content creator's content from being viewable in applications such as feed aggregators. To accommodate this, plug ins to support operations that would normally be performed by a web browser, such as the call backs described in the initial example, could be created, and these plug ins could then be added to aggregation software to enable such software to be used to view the content creator's content without the content creator surrendering his or her control. Similarly, in some cases, systems implemented using the disclosed technology may provide application program interfaces (APIs) which could be used by software developers to assure proper viewing of content by their users (e.g., people who would use software other than a standard internet browser). In such a case, the developers of the software using the APIs would generally be required to register for accounts on VSS servers. This registration would allow for the creation of unique contentKeys for their software, thereby working within the VSS validation framework. Other variations could also be implemented without undue experimentation by those of ordinary skill in the art in light of this disclosure.

In addition to variations such as described above, some embodiments might include optimizations on the basic approach to secure content distribution disclosed herein. As an illustration of how this might function, consider the possibility of using caching to improve the efficiency of retrieving VSS content. For example, in some cases, when a contentKey has been verified for a Host Platform, the data associated with that contentKey can be cached by the VSS server so that database calls are not required for every user who requests content for the same Host Platform. Optimization through storage of data on devices other than the VSS server is also possible. For example, in some embodiments, when a user accesses VSS content on a Host Platform which serves a large amount of VSS content, that Host Platform might add a rapidly (e.g., less than 24 hours) expiring cookie to the user's browser. Such a cookie, which could be specified in the code provided to the Host Platform with the contentKey, could then allow the user to view multiple links to VSS content (and potentially even all VSS content on the Host Platform) without requiring a further validation call to the VSS server for each piece of content.

Optimizations for the prevention of access to VSS content are also possible. For example, in some implementations, Host Platforms where requests for VSS content originate can be recorded and monitored. Host Platforms that are frequent originators of denied requests can be flagged so requests from those Host Platforms can automatically be replied to with the error page. This type of automated denial could be triggered based on automated algorithms (e.g., a Host Platform has a number of denials/month greater than a certain threshold) and/or human examination of data. Of course, in some implementations which include this type of automated denial functionality, there could also be a process which Host Platforms could use to request reconsideration of an automated denial decision, though various limitations may be put on this process, such as only allowing it be used one time (or only automatically granting the first request for reconsideration from a Host Platform, and, thereafter, requiring human approval before an automated denial decision could be overridden).

To provide a concrete example of how optimization of content denials might operate, consider a fictional website, www.westealcontent.com, which uses a content scraping robot to populate their site with content created by others without permission from that content's creators. In this example, assume that www.westealcontent.com's content scraping robot tries to scrape 100 VSS content articles. The result of this attempted scraping will be that, as users try to access the VSS content articles from www.westealcontent.com, validation calls will be sent to the VSS server, and access to those articles will be denied. Once a set number of requests from www.westealcontent.com have been denied, that domain can be blocked at the VSS server, so that all requests from that domain are directed to the error page without having to go through (and fail) the validation process. Additionally, in order to thwart deliberate content thieves who may have multiple domains hosted on a single server, in some embodiments, a VSS server may also evaluate host IP requests. In this way, if the thieves in question are also posting to www.wehatecopyright.com, which is hosted on the same server as www.westealcontent.com, requests from that domain could be aggregated (and potentially blocked) in the analysis described above.

In some embodiments which can perform analysis by aggregating domains or even blocking host IP addresses for particular servers, there may be safeguards implemented to avoid improperly blocking legitimate sites. For example, to deal with the risk that a thief may host multiple sites on a legitimate internet service provider (ISP), rather than automatically blocking the host IP for those domains, a VSS server could generate an email to be sent to the address of the abuse contact listed in the Whois Database for internet domains. This email could list offending domains, and give a legitimate ISP an opportunity to block such sites on their end, thereby avoiding having all their customers being blocked by a VSS blacklist classification. Allowing users to whitelist (or blacklist) Host Platforms (e.g., using an interface as shown in FIG. 5.3) may also be supported in some embodiments and, where it is, such lists could be periodically cross referenced with a global blacklist to assure accurate content distribution and prevent unnecessary processing in validating requests from blacklisted Host Platforms. Algorithms could also be applied to Clients whitelists to remove Host Platforms which are consistently whitelisted from any global blacklist.

While the above disclosure has focused on how the inventors' technology can be used to prevent unauthorized reproduction of content (e.g., by content scrapers), it should be understood that this is not the only use which can be made of the inventors' technology. As an illustration of an additional application for the inventors' technology, consider the possibility of applying that technology to allow content creators to create content a single time, then publish it across multiple digital media and/or manage the distribution points for the content. For example, a content owner might wish to create an application that was a recipe tool. The inventors' technology could be used to cope with the fact that existing recipes are often changed, new recipes are often added, and old recipes are often deleted. In particular, the content owner could use an interface such as shown in FIG. 5.3 to modify content which corresponds to a contentKey that has already been distributed, which would allow fresh content to be automatically pushed to the recipe application without requiring the User to download a new version. the same functionality could also be applied to allowing all content across all platforms to be managed from a singular location. Further, based on the role of the VSS server in providing VSS content to Users, the inventors' technology also provides for easy data collection which could be used to allow content owners to evaluate the effectiveness and reach of their content. Of course, these additional uses are also intended to be merely exemplary of the flexibility and possible applications of the inventors' technology, and so, like the material which preceded them, should not be treated as limiting.

Accordingly, we claim:

1. A method comprising:
   a) receiving, at a content management platform comprising a first processor and a first memory, data from a content creator, the data comprising:
      content; and
      one or more restrictions on accessing the content;
   b) based on a set of instructions on a non-transitory computer readable medium and configuring the content management platform, generating a key for allowing one or more permitted host platforms to present the content;
   c) generating, in a database, a record associating the content with the one or more restrictions on accessing the content;
   d) sending, over a network connection, data comprising the key;
   e) receiving a request for a webpage at a host platform located remotely from the content management platform and comprising a second processor and a second memory, wherein the webpage comprises the key for allowing one or more permitted host platforms to present the content item;
   f) generating, at the host platform, a content access request message comprising the key;
   g) receiving, from the host platform, the content access request message comprising the key, wherein the host platform comprises a location of one or more servers hosting a destination for the content;
   h) comparing the content access request message with the one or more restrictions on accessing the content;
   i) based on the comparison, responding to the content access request message with a response page taken from the set of pages consisting of:
      a page providing the content; and
      an error page.

2. The method of claim 1, wherein:
   a) the method further comprises, at the content provider platform, automatically generating the page providing the content;
   b) the page providing the content comprises the content; and
   c) the page providing the content comprises at least one element taken from the set consisting of:
      i) Javascript operable to configure a computer to add transparent images over the content; and
      ii) cascading style sheets operable to configure a computer to add garbled text which is invisible to authorized users to the content.

3. The method of claim 1 wherein the restrictions on accessing the content comprise:
   a) a first restriction restricting locations where the content can be accessed to the one or more permitted host platforms;
   b) a second restriction restricting times when the content can be accessed; and
   c) a third restriction restricting tools through which the content can be accessed.

4. A machine comprising:
   a) a content management platform comprising a first processor and a first memory, wherein the content management platform is configured to:
      i) allow a content creator to upload data comprising:
         content; and
         one or more restrictions on accessing the content;
      ii) generate a key for allowing one or more permitted host platforms to present the content;
      iii) create a database record associating the content with the one or more restrictions on accessing the content;
      iv) provide the content creator data comprising the unique key;
      v) receive a content access request message, the content access request message comprising the key;
      vi) compare the content access request message with the one or more restrictions on accessing the content;
      vii) based on the comparison, respond to the content access request message with a response page taken from the set of pages consisting of:
         a page providing the content; and
         an error page;
   b) a host platform comprising a second processor and a second memory, wherein the host platform comprises a location of one or more servers hosting a destination for the content, wherein the host platform is configured to:
      i) receive a request for a webpage, wherein the webpage comprises the key for the content;
      ii) based on receiving the request, generate the content access message;
      iii) send the content access message to the content management platform;
      iv) receive the response page from the content management platform; and
      v) provide, to the source of the request for the webpage, data comprising the response page.

5. The machine of claim 4, wherein:
   a) the content provider platform is configured to automatically generate the page providing the content;
   b) the page providing the content comprises the content; and
   c) the page providing the content comprises at least one element taken from the set consisting of:
      i) Javascript operable to configure a computer to add transparent images over the content; and
      ii) cascading style sheets operable to configure a computer to add garbled text which is invisible to authorized users to the content.

6. The machine of claim 4 wherein the restrictions on accessing the content comprise:
   a) a first restriction restricting locations where the content can be accessed to the one or more permitted host platforms;
   b) a second restriction restricting times when the content can be accessed; and
   c) a third restriction restricting tools through which the content can be accessed.

7. The machine of claim 4 wherein:
   a) the host platform is further configured to detect whether a user computer from which the request for the webpage is received has an access cookie;
   b) based detecting that the user computer does not have an access, provide an access cookie to the user computer; and
   c) for a content access request message based on receiving a request from a user computer which has an access cookie, the content management platform is configured to provide the page providing the content without comparing the content access request message with the one or more restrictions on accessing the content.

8. The machine of claim 4, wherein the content management platform is configured to:
   a) track content access request messages from a plurality of host platforms;
   b) designate a content access request message from a particular host platform as a blocked content access request message based on a number of responses comprising the error page sent to the particular host platform;
   c) for content access request messages designated as blocked content access request messages, respond to the blocked content access request messages with the error pages without comparing the blocked content access request messages with the one or more restrictions on accessing the content.

9. A method, performed in a user-transparent manner, for providing content to a host platform, wherein the host platform comprises a location of one or more servers hosting a destination for the content, the method comprising:
   a) receiving a request for a webpage at the host platform, wherein the webpage comprises a key for allowing one or more permitted host platforms to present a content item;
   b) generating, at the host platform, a content access request message comprising the key;
   c) receiving the content access request from the host platform, the content access request comprising the key for allowing one or more permitted host platforms to present the content item;
   d) using the key for allowing one or more permitted host platforms to present the content item to retrieve one or more restrictions associated with the content item;
   e) comparing information provided by the host platform with the key allowing one or more permitted host platforms to present the content item against one or more restrictions on accessing the content item;
   f) based on the comparison, responding to the content access request with a response taken from the set consisting of:
   a response page providing the content item; and
   an error page.

10. The method of claim 9, wherein:
    a) the following acts are performed at a remote content delivery system:
    receiving the content access request;
    using the key for allowing one or more permitted host platforms to present the content item;
    comparing information; and
    responding to the content access request;
    b) performing the method in a user-transparent manner comprises the content delivery system responding to the content access request without requesting, and without reference to, any information identifying or authenticating the user.

11. The method of claim 9, wherein:
    a) the act of responding to the content access request is performed by a content delivery system remote from both the user and the host platform; and
    b) the user is not required to perform any act beyond accessing the page from the host platform using a web browser for the method to be performed and the content delivery system to respond to the content access request with the response page providing the content item.

12. The method of claim 9, wherein the host platform comprises at least one of a universal resource locator for a website, a universal resource locator for a mobile website, an application programming interface key to an application, and an extensible markup language file.

* * * * *